United States Patent [19]

Young

[11] 3,915,521

[45] Oct. 28, 1975

[54] LUBRICATED RADIAL BEARING ASSEMBLY

[75] Inventor: John H. Young, South Windsor, Conn.

[73] Assignee: United Technologies Corporation, Hartford, Conn.

[22] Filed: Sept. 30, 1974

[21] Appl. No.: 510,343

[52] U.S. Cl.............. 308/187; 308/37; 308/184 R; 308/194; 308/196
[51] Int. Cl.².................. F16C 1/24; F16C 19/08; F16C 21/00; F16C 33/78
[58] Field of Search ....... 308/37, 78, 187, 194, 196, 308/184 R

[56] References Cited
UNITED STATES PATENTS

| | | |
|---|---|---|
| 3,504,955 | 4/1970 | Bailey ............................ 308/187 X |
| 3,531,167 | 9/1971 | Edge et al. ......................... 308/187 |

Primary Examiner—M. Henson Wood, Jr.
Assistant Examiner—Howard Beltran
Attorney, Agent, or Firm—Robert C. Walker

[57] ABSTRACT

Apparatus for supporting a rotor assembly of a gas turbine engine is disclosed. A lubricated ball type thrust bearing which supports one end of the rotor shaft is disposed within a bearing compartment formed between the rotor assembly and the engine stationary structure. One or more carbon seals, in operative relation to a seal plate on the rotor assembly, prevent the flow of excess ambient engine air into the compartment. Lubricating and cooling oil is supplied to the compartment where it is positively apportioned between the bearing and the seal plate.

5 Claims, 4 Drawing Figures

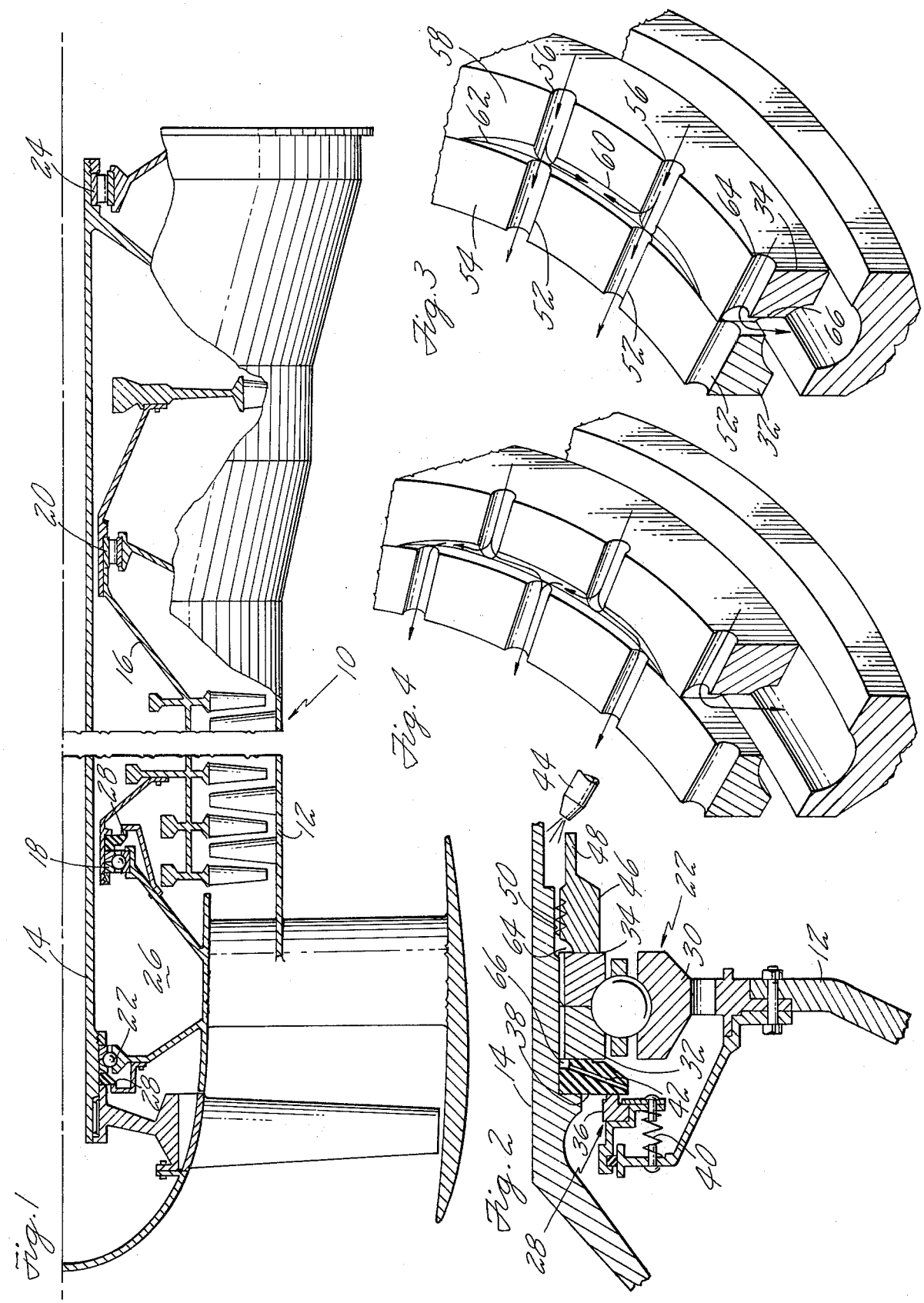

LUBRICATED RADIAL BEARING ASSEMBLY

BACKGROUND OF THE INVENTION

1. Field of the Invention

This invention relates to gas turbine engines and more specifically to apparatus for supporting an engine rotor assembly.

2. Description of the Prior Art

The construction of gas turbine engines has always required precise engineering to ensure the structural integrity of individual components during operation of the engine. One particularly critical area of concern remains to be the apparatus for supporting the rotor shafts including means for transferring thrust loads from the rotor assembly to the supporting case structure. In a typical engine each rotor shaft is supported at a first point by a roller bearing and at a second point by thrust type ball bearing. Rotor speeds of engines in commercial service today are commonly in excess of 5,000 rpm but advanced engines rotate at speeds greatly exceeding that value.

In order to reduce friction between the contact surfaces of the bearing assembly and in order to cool the bearing assembly, a lubricating and cooling fluid is circulated through the bearing during operation of the engine. U.S. Pat. No. 3,504,955 to Bailey shows means for lubricating the wear surfaces and for removing heat from a bearing by flowing oil radially through the inner race of a ball bearing assembly. The method for distributing oil to the bearings as shown in Bailey is common in the art and utilizes centrifugal force to pump oil through the radial passages of the spinning inner race into the bearing assembly.

Within a gas turbine engine it is desirable and practical to recover the oil pumped through the bearings for subsequent reuse. A sealed bearing compartment is commonly provided to contain the oil and oil mist after it exudes from the bearing. The bearing compartment is vented to the atmosphere to provide a bearing compartment pressure which is less than the pressure of the surrounding ambient engine air to prevent the escape of oil mist from the bearing compartment. Compartment seals prevent the ingestion of excess air into the bearing compartment. Where excess air is allowed to flow through the bearing compartment to a downstream oil separator, a portion of the oil, in the form of a mist, is carried through the separator to the atmosphere. Operation of the engine in this condition within a short period of time depletes the limited amount of oil carried with the engine.

Carbon seals are commonly used at the interfaces between the rotor assembly and the stationary structure. These seals comprise a stationary carbon ring which is urged by a spring member against a metallic seal plate which is rotatively coupled to the rotor assembly. Friction between the carbon ring and the seal plate generates an amount of heat which is destructive to the carbon ring. Oil cooling of the seal plate prevents excessive wear on the carbon ring. Gas turbine engines in commercial usage today commonly incorporate means for flowing oil axially past the bearings to the seal plate of the bearing compartment seal. A cylindrical sleeve having axial grooves is fitted between the shaft and the bearing inner race, the sleeve being adapted to flow oil beneath the inner race to the seal plate. A plurality of radial grooves or conduits extend from the axial grooves of the sleeve member through the inner race to provide oil to the bearing for lubrication. A circumferential groove in the inner race is provided to communicatively join the axial and radial grooves. As the rotor speeds become extremely high the pumping action of the fluid under centrifugal force in the radial passages draws an ever increasing amount of oil from the axial passages, thereby, starving the downstream seal plate of oil and causing destructive overheating of the carbon ring.

The length of the rotor shaft of a gas turbine engine is limited by a critical rotor speed at which excessive vibration occurs. The critical rotor speed is a function of the unsupported length and the diameter of the rotor shaft. If the shaft diameter is increased as in constructions not employing the oil distribution sleeve, the critical speed correspondingly increases. Coincidentally, vibration is induced when the rotor shaft is not concentric with the supporting bearing. In the sleeve construction described above, the eccentricity between the rotor and bearing is the sum of the rotor outer diameter eccentricity and the sleeve outer diameter eccentricity. It is, therefore, desirable to find alternative oil distribution means which do not incorporate a shaft sleeve member.

Rotor support apparatus having an improved concentricity tolerance and a maximized inner diameter will significantly increase the structural integrity of a turbine engine. In all cases it is essential that a constant flow of oil be maintained to both the carbon seal plate and to the bearing. The restriction of oil supplied to any area may result in catastrophic engine failure when the bearing becomes starved for oil.

SUMMARY OF THE INVENTION

The primary object of the present invention is to improve the structural integrity of a rotor assembly of a high speed turbine engine. A further object of the present invention is to ensure the flow of cooling oil through the rotor support bearing to a bearing compartment seal while maintaining an adequate supply of oil to the bearing for lubrication and cooling. Additionally, the outer diameter of the rotor shaft is maximized to increase the rotor critical speed.

The present invention is predicated upon the recognition that bearing compartment seals become starved of oil when oil flowing through interconnected axial and radial conduits in the inner race of a bearing is directed radially by the pumping action of centrifugal force on the radial flow. This action diverts the oil flowing through the axial passages to the bearing compartment seals into the radial conduits and commonly goes undetected as the total flow of oil remains substantially constant. Further recognizing that the integration of the oil distribution grooves into the inner race of the bearing allows an increase in the outer diameter of the rotor shaft, the shaft critical speed is correspondingly increased.

According to the present invention cooling and lubricating oil is flowed beneath the inner race of a rotor support bearing through a first set of axial grooves which are interconnected by an interrupted circumferential groove; one or more second axial grooves are each intercepted by a radially extending conduit through which oil is flowed into the bearing.

A primary feature of the present invention is a split inner race bearing having a first set of axial grooves which extend along the inner diameter of the inner race toward the bearing compartment seals. One or more interrupted circumferential grooves extend over a portion of the inner circumference of the front inner race to communicatively join two or more of the axial grooves. One or more radial conduits in the front inner race each extend through the inner race from a second axial groove in the front inner race at the rotor shaft.

A principal advantage of the present invention is the positive distribution of cooling oil to the bearing assembly and to the bearing compartment seals. The interrupted circumferential grooves of the front inner race allow the cross flow of oil between members of the first set of axial grooves while isolating this flow from the radial conduits which lead from the second axial grooves. The integral groove construction of the inner race permits the use of increased diameter shafts to correspondingly increase the critical speed of the rotor assemblies. The magnitude of the rotor vibration is reduced by a corresponding reduction in eccentricity between the bearing inner diameter and the shaft outer diameter.

BRIEF DESCRIPTION OF THE DRAWING

FIG. 1 is a simplified partial cross section view showing the rotor assemblies of a gas turbine engine and apparatus for supporting each rotor;

FIG. 2 is a simplified and enlarged cross section view of the low rotor thrust bearing shown in FIG. 1;

FIG. 3 is a simplified and enlarged perspective view of a portion of the inner race of the low rotor thrust bearing showing oil distribution grooves; and FIG. 4 is a simplified and enlarged perspective view of a portion of the inner race of the low rotor thrust bearing showing the oil distribution grooves when the front and rear inner races of the bearing are in misalignment.

DESCRIPTION OF THE PREFERRED EMBODIMENT

A simplified turbofan engine 10 is shown in partial cross section in FIG. 1. A stator assembly 12 surrounds a low rotor assembly 14. A high rotor assembly 16 is concentric with and disposed between the low rotor assembly and the stator assembly. The high rotor assembly is supported by a ball type thrust bearing 18 and a roller type bearing 20. The low rotor assembly is supported by a ball type thrust bearing 22 and a roller type bearing 24. A bearing compartment 26 is formed between the rotor and stator assemblies. Bearing compartment seals 28 prevent the ingestion of excess air into the bearing compartment.

FIG. 2 is a cross section through a portion of the bearing compartment shown in FIG. 1. The ball type thrust bearing 22 has an outer race 30 which is affixed to the stator assembly 12. The bearing inner race comprises a rear member 32 and a front member 34. The bearing compartment seal 28 prevents the leakage of air between the low rotor assembly 14 and the stator assembly, a carbon ring 36 being urged against a rotating seal plate 38 by a spring member 40. The seal plate has cooling holes 42 through which oil is flowed to prevent destructive overheating of the carbon ring. An oil supply nozzle 44 provides oil to the seal plate and to the bearing. A retaining nut 46, having an oil scoop 48 and a conduit 50 through which oil is flowed to the bearing assembly, couples the bearing to the rotor assembly.

FIG. 3 is a perspective view of a portion of the rear inner race 32 and the forward inner race 34. The rear inner race has a plurality of axial grooves 52 disposed about the inner circumferential surface 54 of the rear race. A plurality of first axial grooves 56 which are disposed about the inner circumferential surface 58 of the forward race are communicatively joined by an interrupted circumferential groove 60 at a face 62 of the front race which is contiguous with the rear race. One or more second axial grooves 64 in the inner circumferential surface of the front race are each communicatively joined to a radial groove 66 in the contiguous face 62 of the front race.

During operation of a turbofan engine such as that shown in FIG. 1, the combination of thrust load and shaft rotation speed produce large quantities of heat through friction within the bearing assembly and at the interface of the bearing compartment seals. Cooling and lubricating oil is supplied through the nozzle 44 to the oil scoop 48. The axial conduits 50 in the retaining nut are inclined in the downstream direction away from the center of rotation of the rotor assembly. Centrifugal force urges the oil through the retaining nut conduit to a first cavity 64 as is shown in FIG. 2. The first axial grooves 56 and second axial grooves 64 of the front inner race are in communication with the first chamber and receive oil therefrom. The first axial grooves 56 and second axial grooves 64 of the front inner race are also inclined in a downstream direction away from the center of rotation of the rotor assembly to further urge the flow of oil axially along the rotor shaft to either the axial grooves 52 of the rear inner race or the radial grooves 66 in the contiguous face of the front inner race. Oil flows axially through the grooves of the rear inner race to a second cavity 66 formed between the seal plate, the rear inner race and the rotor shaft. Again under the influence of centrifugal force, oil flows from the second cavity through the cooling holes 42 of the seal plate 48.

In one prior construction a plurality of axially oriented grooves were machined into a rotor sleeve. The sleeve was then concentrically disposed between the rotor shaft and the bearing assembly. A plurality of radial conduits penetrated the shaft sleeve and the inner race of the bearing assembly to flow oil to the bearings. Centrifugal force accelerated oil within the radial conduit and drew axially flowing oil from the shaft sleeve. During certain operating conditions the axial flow of oil through the shaft sleeve to the bearing compartment seals was predominantly diverted through the radial passages. A fully circumferential groove in the shaft sleeve or inner race connected the axial passages and facilitated the oil starvation of the bearing compartment seal even in constructions where the number of radial passages was limited. In the embodiment of the present invention shown in FIG. 3, the first set of axial grooves 56 are joined by an interrupted circumferential groove 60. Angular misalignment between the front and rear inner races, as shown in FIG. 4, is accommodated by the interrupted circumferential groove which communicatively joins the first axial grooves of the front inner race to a plurality of axial grooves of the rear inner race. Oil flowing through the second axial grooves 64 of the front inner race is intercepted by the radial grooves 66 in the contiguous face 62. Oil flowing through the radial grooves is pumped by centrifugal force to the bearings.

The amount of oil flowed to either the bearing assembly or the bearing compartment seal is positively apportioned by altering the ratio of first and second axial grooves in the front inner race. In one particularly high speed application where the rotor assembly was rotated at 17,000 rpm, the oil flow was apportioned 65% to the bearing compartment seal and 35% to the bearing assembly. This flow apportionment was accomplished by providing a front inner race having 15 first axial grooves and 8 second axial grooves.

The integration of the oil distribution grooves into the inner race of the bearing allows the bearing to be fitted directly over the rotor shaft without an intermediate oil distribution sleeve. Consequently, the outer diameter of the shaft is increased where a corresponding increase in the critical shaft speed is desired. The elimination of the oil distribution sleeve further reduces the concentricity tolerances between the bearing inner diameter and the shaft outer diameter. Because concentricity deviations between the rotating and stationary members of a gas turbine engine are a prime source of rotor vibration, this reduction in concentricity tolerances significantly reduces the magnitude of rotor vibration.

Although the support apparatus has been described with respect to the forward thrust bearing of a turbofan low rotor shaft, the invention embodied therein is equally applicable at all shaft support locations of any gas turbine engine and it should be understood by those skilled in the art that the foregoing and other changes in the form and detail thereof can be made without departing from the spirit and the scope of the present invention.

Having thus described typical embodiments of my invention, that which I claim as new and desire to secure by letters patent of the United States is:

1. A bearing assembly for supporting a rotor of a gas turbine engine which comprises:
   a rear inner race having an inner circumferential surface with a plurality of axial grooves disposed about the inner circumferential surface; and
   a front inner race including,
      an outer circumferential surface,
      an inner circumferential surface having a plurality of first axial grooves and a plurality of second axial grooves disposed about the inner circumferential surface, and
   a face contiguous with the rear inner race having a plurality of radial grooves extending from the second axial grooves of the inner circumferential surface to the outer circumferential surface and an interrupted circumferential groove in the inner circumferential surface at the contiguous face which communicatively joins at least one of the first grooves of the front race to at least one of the axial grooves of the rear race and which is communicatively isolated from said second axial grooves of the front inner race.

2. The invention according to claim 1 wherein the axial grooves of the rear inner race are equidistantly disposed about the inner circumferential surface of the rear inner race.

3. The invention according to claim 1 wherein the first and second axial grooves of the front inner race are equidistantly disposed about the inner circumferential surface of the front inner race.

4. The invention according to claim 3 having eight radial grooves in the contiguous face of the front inner race.

5. In a bearing assembly which supports a rotor of a gas turbine engine and has a split inner race including a rear race having an inner circumferential surface, and a front race having an inner circumferential surface and a face contiguous with the rear race, the improvement which comprises:
   a plurality of axial grooves which are disposed about the inner circumferential surface of the rear inner race;
   a plurality of first axial grooves which are disposed about the inner circumferential surface of the front inner race and are communicatively joined to at least two of the axial grooves of the rear inner race by an interrupted circumferential groove in the front inner race; and
   at least one radial conduit which penetrates the front inner race and is communicatively joined to a second axial groove in the inner circumferential surface of the front inner race and which is communicatively isolated from said first axial grooves.

* * * * *

UNITED STATES PATENT OFFICE
CERTIFICATE OF CORRECTION

PATENT NO. : 3,915,521
DATED : October 28, 1975
INVENTOR(S) : John H. Young

It is certified that error appears in the above-identified patent and that said Letters Patent are hereby corrected as shown below:

Column 3, line 4, after the word "the" insert --first--.

Signed and Sealed this tenth Day of February 1976

[SEAL]

Attest:

RUTH C. MASON
*Attesting Officer*

C. MARSHALL DANN
*Commissioner of Patents and Trademarks*